(12) United States Patent
Bauer et al.

(10) Patent No.: US 7,588,340 B2
(45) Date of Patent: Sep. 15, 2009

(54) REFRIGERATING APPLIANCE COMPRISING AN INTERNAL OLED LIGHTING SYSTEM

(75) Inventors: Peter Bauer, München (DE); Fritz Hägele, Herbrechtingen (DE); Erich Hell, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 130 days.

(21) Appl. No.: 10/567,323

(22) PCT Filed: Aug. 30, 2004

(86) PCT No.: PCT/EP2004/009651
§ 371 (c)(1),
(2), (4) Date: Feb. 7, 2006

(87) PCT Pub. No.: WO2005/024323
PCT Pub. Date: Mar. 17, 2005

(65) Prior Publication Data
US 2006/0201181 A1    Sep. 14, 2006

(30) Foreign Application Priority Data
Aug. 29, 2003    (DE) .............................. 103 39 904

(51) Int. Cl.
*F21V 33/00*    (2006.01)
(52) U.S. Cl. .................. 362/92; 362/222; 362/800; 362/223; 362/154; 362/85; 362/362

(58) Field of Classification Search ............... 362/92, 362/222, 800, 223, 154, 85, 147, 362; 62/264, 62/246
See application file for complete search history.

(56) References Cited

U.S. PATENT DOCUMENTS

| | | | |
|---|---|---|---|
| 6,059,420 A * | 5/2000 | Rogers ........................ 362/92 |
| 6,478,445 B1 * | 11/2002 | Lange et al. ................ 362/223 |
| 7,107,779 B2 * | 9/2006 | Avenwedde et al. .......... 62/264 |
| 7,121,675 B2 * | 10/2006 | Ter-Hovhannisian ......... 362/92 |
| 2002/0180671 A1 | 12/2002 | Inukai |
| 2003/0017360 A1 | 1/2003 | Tai et al. |
| 2003/0042852 A1 * | 3/2003 | Chen .......................... 313/512 |
| 2003/0072147 A1 | 4/2003 | Pashley et al. |
| 2003/0122455 A1 * | 7/2003 | Caldwell ........................ 312/6 |
| 2006/0012985 A1 * | 1/2006 | Archie et al. ............... 362/227 |
| 2008/0245788 A1 * | 10/2008 | Choong et al. ............. 219/758 |

FOREIGN PATENT DOCUMENTS

DE    101 17 105    6/2002
EP    1 076 215    2/2001

OTHER PUBLICATIONS

International Search Report PCT/EP2004/009651.

* cited by examiner

Primary Examiner—Sandra L O'Shea
Assistant Examiner—Jessica L McMillan
(74) Attorney, Agent, or Firm—James E. Howard (57) ABSTRACT

A refrigerating appliance, especially a refrigerating or freezing appliance, including an inside area and an internal lighting system. The appliance internal lighting system includes at least one organic light-emitting diode (OLED) for substantially uniformly illuminating the inside area of the appliance.

15 Claims, 6 Drawing Sheets

REFRIGERATING APPLIANCE COMPRISING AN INTERNAL OLED LIGHTING SYSTEM

The present invention relates to a refrigerating appliance comprising an internal OLED lighting system.

In present-day refrigerating appliances, especially in refrigerators or freezers, the interior of the appliance is usually illuminated using a lamp comprising a single incandescent lamp as illuminant. This is usually switched on and off on opening and closing the door of the appliance by a switch actuated by the door. The lamp is mounted on one of the internal walls of the appliance, usually on the ceiling area or one of the side walls. As a result of built-in components in the appliance such as base plates, pull-out drawers or door compartments and as a result of food which has been inserted, which act as light barriers, large parts of the appliance are not reached or only inadequately reached by the light emanating from the lamp. Thus, only non-uniform illumination of the interior of the appliance is possible using the above conventional incandescent lamp illumination.

In general, however, it would also be feasible to arrange a plurality of incandescent lamp lighting systems at different points inside the appliance. However, this would bring with it the disadvantage that this requires additional space inside the interior of the appliance. This is likewise undesirable however since the largest possible interior volume is desired with small external dimensions of the appliance.

It is thus the object of the present invention to provide a refrigerating appliance with interior lighting which ensures uniform illumination of the interior of the appliance and additionally occupies little space.

The object is solved by a refrigerating appliance according to claim 1. Further advantageous embodiments of the appliance are the subject matter of the dependent claims.

Accordingly, a refrigerating appliance comprising an interior and an interior lighting system is provided wherein the interior lighting system comprises at least one organic light-emitting diode (OLED) which illuminates the interior.

As is explained hereinafter, organic light-emitting diodes can be constructed as large-area light sources. Thus, it is possible to fit all interior areas of the appliance with these OLEDs whereby uniform illumination of the interior of the appliance can be achieved. Built-in components in the appliance such as base plates, containers, door compartments or food which has been brought in, scarcely act as light barriers which result in inadequate lighting compared to conventional illumination of the interior of the appliance using an incandescent lamp. Uniform illumination of the interior of the appliance is also possible in different loading states of the appliance. In addition, the OLEDs require little space. The OLEDs can be constructed as very flat structures. The interior of the appliance can thus be completely used for interior built-in components and food. The organic light-emitting diodes can also be applied to curved surfaces of the appliance interior.

The organic light-emitting diodes (OLEDs) used as part of the present invention generally consist of a substrate, an electrode, one or a plurality of organic layers and a counter-electrode. Said components are generally constructed in the form of thin layers which are stacked one upon the other in a "sandwich structure". An example of an OLED structural element for use for a display device is described in DE 102 32 937 A1.

The substrate is generally transparent, glass or quartz being particularly preferred. Plastic films or glass/plastic laminates can also be used as substrates. Plastics such as polyethylene terephthalate (PET) or polyethylene naphthalate (PEN) can be used.

An electrically conducting transparent layer is usually located on the substrate as an electrode. This preferably consists of a transparent, electrically conducting oxide material such as indium tin oxide (ITO). Alternatively, other transparent conducting materials, such as thin metal films can also be used. The transparent conducting electrode layer is preferably used as an anode.

One or a plurality of layers of organic materials are usually located on the electrode layer, but at least one electroluminescent, i.e. light-emitting layer. Each organic layer can be configured so that it executes one or a plurality of functions such as hole injection, hole transport, electron injection, electron transport and/or light emission (electroluminescence). However, it can also comprise a single intermediate layer. The organic layers can consist of polymers, oligomers or small functional molecules.

Finally, one or a plurality of layers of conducting materials, preferably metals or metal alloys are located on the organic layers as a counter-electrode. In this case, the counter-electrode usually serves as the cathode. The counter-electrode is preferably constructed of two layers: an underlayer which is formed of a metal having a low work function such as Ca, Mg, Ba or Li and a covering layer made of a metal which is more stable to air and having a high work function such as Ag or Al.

The thickness of each layer comprising the OLED can generally lie between about 10 nanometers and 20 micron and is usually in the range between 50 nanometers and 20 micron.

During operation, a voltage is applied between the electrode and the counter-electrode, charge carriers are injected into the organic layers, recombination takes place and some of the recombination energy leaves the OLED as photons. The photons pass through the transparent electrode layer and the transparent substrate and are visible as emitted light.

The OLEDs are preferably protected by encapsulation since both the organic layers and also some electrode materials react sensitively to oxidation by oxygen and moisture.

In the refrigerating appliance according to the invention, the at least one organic light-emitting diode can be mounted on an internal wall of the appliance or a built-in component located in the appliance such as a base plate, a shell or a door compartment. In this case, the OLED forms a component separate from the internal wall of the refrigerating appliance or the built-in component in the appliance, which is preferably mounted on the internal wall or the built-in component by gluing, screwing, engagement etc. An advantage of this configuration is that the OLED can be mounted in a simple manner. In addition, it is also easy to remove or exchange again, for example, in the event that a defect should occur at the OLED.

A further alternative embodiment of the invention provides that the OLED is integrated in one of the internal walls of the appliance. In general, refrigerating appliances comprise a housing comprising at least one cavity filled with an insulating material. In the design integrated in the interior wall of the appliance, the at least one OLED forms a wall of this cavity facing the interior of the appliance, that is usually a part or a complete interior wall of the appliance. Additionally or alternatively, one or a plurality of OLEDs can be integrated in the walls of a built-in component located in the appliance such as a base plate, a shell or a door compartment. Among other things, the integrated design of OLEDs has the advantage that the organic light-emitting diodes are protected from mechanical and chemical influences.

The refrigerating appliance according to the invention can be equipped with a plurality of organic light-emitting diodes. In this case, the appliance can contains OLEDs mounted on internal walls of the appliance or walls of built-in components as separate components and also OLEDs built into the walls or partitions are described previously.

The OLED can be supplied with current via electrical contacts preferably located in the relevant internal wall or the relevant built-in component. A low-voltage supply is generally sufficient. If the OLED is integrated in one of the internal walls of the refrigerating appliance, the power supply can advantageously be accomplished inside this internal wall. If the OLED, for example, is mounted on one of the base plates or door compartments located in the appliance or in their walls, the power supply can be effected by means of contacts on the respective suspension, slide-in or supporting elements located on the internal walls, on which the base plates or door compartments are held.

Within the scope of the present invention, one or a plurality of OLEDs preferably form a luminous surface which fills at least 20%, especially at least 50% of the internal wall of the appliance and/or the underside or upper side of a base plate located in the interior of the appliance. Thus, individual desired areas of these surfaces can be illuminated. The OLED or OLEDs preferably completely fill(s) at least one internal wall of the appliance and/or at least one underside or upper side of a base plate located in the appliance.

The luminous area of the OLED is preferably located on one of the following internal walls of the appliance: the rear wall, one of the side walls, the bottom area, the ceiling area or the door internal wall. Preferably a plurality of OLEDs are located on different internal walls in the refrigerating appliance. An interior lighting system where OLEDs completely fill the rear wall and both side walls of the interior of the appliance is advantageous for example. Particularly good illumination of the interior is achieved if the ceiling area is additionally filled with OLEDs.

A transparent plate is preferably used as the substrate for the OLEDs. The transparent plate is preferably a glass or plastic plate which is directly facing the interior of the appliance. Located therebehind, facing away from the interior of the appliance and therefore protected, are the other material layers forming the OLED such as an electrode, one or a plurality of layers of organic materials and a counter-electrode. In the case of an integrated design of OLED in one of the internal walls of the refrigerating appliance, an insulating material could directly follow the counter-electrode and then the outer wall of the refrigerating appliance. Glass plates have substrates have the advantage that they effectively protect the luminous material of the OLEDs from oxygen and moisture and they release no hazardous contaminants to the food stored in the refrigerating appliance.

Within the scope of the present invention, as is the case with the internal walls of the refrigerating appliance, the OLEDs can be arranged such that they emit light in one direction. In the case of base plates or other built-in components for example, it can however be advantageous if light is emitted from two opposing surfaces. One embodiment of the refrigerating appliance according to the invention thus provides that on a built-in component of the appliance having opposing surfaces, respectively at least one organic light-emitting diode is mounted on each of the opposing surfaces. In the case of a base plate, this is therefore on the lower and upper side. In the case of an integrated OLED design, the opposing surfaces are preferably each formed from transparent plates such as glass plates or plastic plates. These plates can then form substrates of OLEDs whose material layers such as electrode layers and organic material layers are arranged between the plates.

Within the scope of the present invention, the housing of the refrigerating appliance is preferably formed of a plurality of housing panels which also form the inner walls of the appliance. This embodiment especially simplifies the manufacture of refrigerating appliances wherein one or a plurality of OLEDs are integrated in at least one of the preferably flat housing panels. In this case, the housing panels can be provided with the OLEDs separately from one another and then combined to form the housing of the refrigerating appliance. Flat housing panels also facilitate the application of diode material layers.

In the refrigerating appliance according to the invention, the light-emitting layers of the OLEDs preferably emit light of different colour spectra. Thus, an interior lighting system with different colour effects can be achieved. The different light colours can be used, for example, to make different temperature zones in the interior of the refrigerating appliance identifiable.

The refrigerating appliance according to the invention preferably has a display panel and/or control panel which can be back-lit using one or a plurality of organic light-emitting diodes.

Furthermore, the refrigerating appliance can have a display panel for displaying symbols, the symbols being formed by OLEDs. In this case, the display panel and/or the control panel can also be located on one of the walls facing the interior of the refrigerating appliance or one of the built-in components of the appliance and thus serve at the same time as interior lighting of the appliance.

Further embodiments and advantages of the present invention are explained hereinafter with reference to embodiments of the present invention. In the figures.

Figure 1:
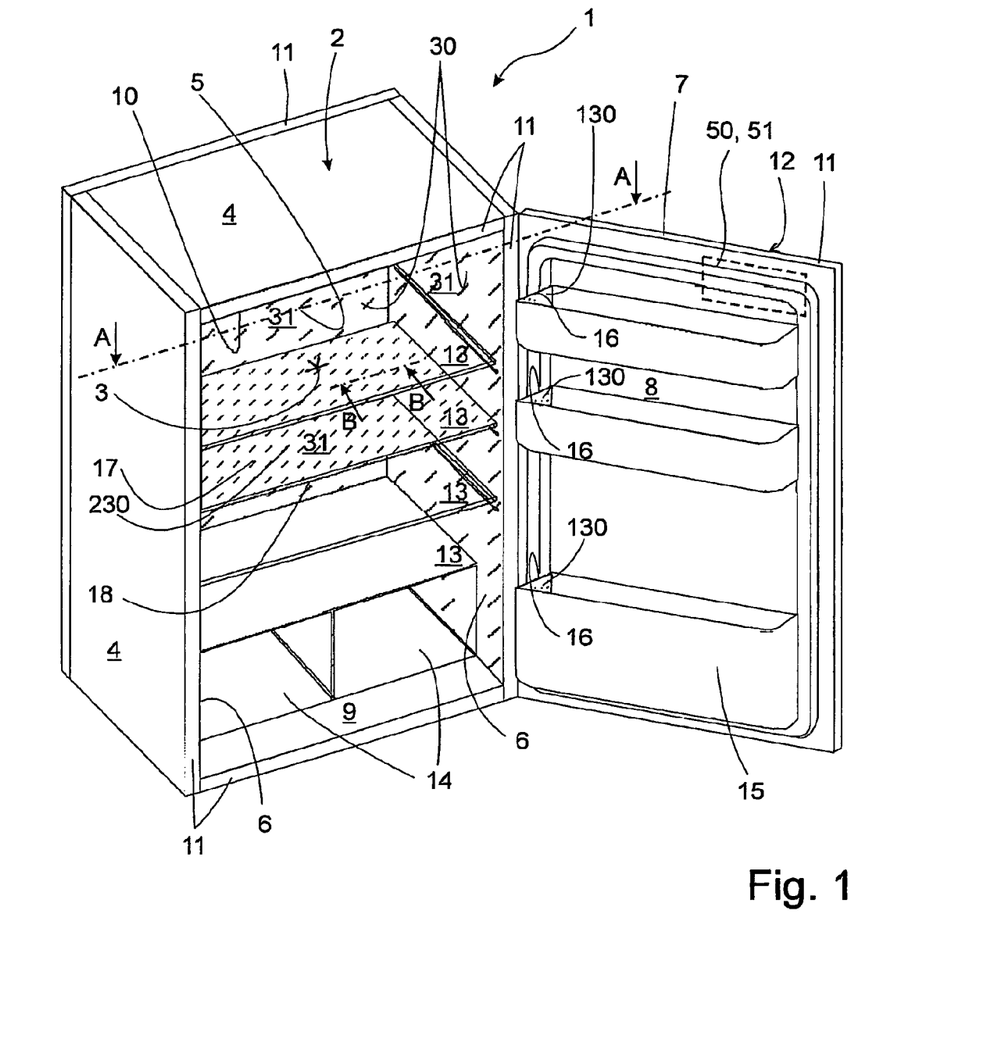
FIG. 1 is a perspective view of a first embodiment of a refrigerating appliance 1 according to the present invention.

FIG. 1 shows a first embodiment of a refrigerating appliance 1, this case in the embodiment of a refrigerator 1. The refrigerating appliance 1 comprises a housing 2 which is formed from a plurality of housing panels 11, a total of six, which are joined together. In this case, each housing panel 11 is in each case both an inner wall 5, 6, 8, 9, 10 and also an outer wall 4 of the refrigerating appliance 1. The refrigerating appliance 1 comprises the following inner walls: a bottom area 9, respectively two side walls 6, a ceiling area 10 and a rear wall 5 and a door inner wall 8 of a door 7. The refrigerating appliance 1 has an interior space 3 which is fitted with base plates 13, containers 14 in the form of pull-out drawers 14 and door compartments 15 for placing or inserting food.

The rear wall 5 and the two side walls 6 each comprise an organic light-emitting diode (OLED) 30 used for illuminating the interior 3 of the refrigerating appliance 1. These are integrated in the corresponding inner walls 5, 6 of the refrigerating appliance 1 which will be explained in detail hereinafter with reference to FIG. 3. The OLEDs 30, as shown in FIG. 1, each comprise a luminous area 31 which completely fills the respective inner wall 5, 6 of the appliance 1. However, the OLEDs can also only fill individual desired areas of the inner walls 5, 6, which is not shown. For example, the OLEDs 30 can only extend over about at least 30% or at least 50% of the respective areas. This depends substantially on the configuration and distribution of the built-in components 13, 14 and 15 in the refrigerating appliance 1. The crucial factor here is whether these are transparent or permeable to light or not. In addition, the remaining inner walls of the refrigerating appliance such as the base area 9, the ceiling area 10 and the door inner wall 8 can each be fitted with one or a plurality of OLEDs 30. It is also feasible for only one of the inner walls 5, 6, 8, 9, 10 of the refrigerating appliance to be illuminated with one or a plurality of OLEDs 30, for example, the rear wall 5.

Furthermore, the refrigerating appliance 1 comprises further organic light-emitting diodes 130 on the door compartments 16. In this case, the OLEDs 130 are each mounted on side walls 16 of the door compartments 15. In this case, the OLEDs 130 are attached to the walls 16, for example by gluing. This is explained in further detail with reference to FIG. 4.

Further organic light-emitting diodes 230 are integrated in one or a plurality of the base plates 13, and specifically here in the second highest base plate 13. This base plate 13 comprises respectively one OLED 230 on its upper side 18 and its lower side 19, its luminous area 31 completely filling respectively one side 18, 19. Thus, light is emitted from both opposite surfaces of the sides 18, 19 of the base plate 13. As a result, the area above and below this base plate 13 are better illuminated. The detailed configuration of the OLED-illuminated base plate 13 will be discussed in detail with reference to FIG. 5. The other two base plates 13 are transparent.

The refrigerating appliance according to FIG. 1 furthermore has a display panel 50 and a control panel 51 on the outer wall 12 of its door 7, both said panels having OLEDs 330 or 340. This will be explained hereinafter with reference to FIG. 9.

The OLEDs 30 integrated in the inner walls 5, 6 of the refrigerating appliance 1 and the base plate 13 and the OLEDs 130 mounted on the door compartments 16 have light-emitting layers with different emission spectra. Thus, in addition to the actual illumination of the interior 3, colour emphasis can also be placed in the refrigerating appliance 1. OLEDs having different spectra, for example white OLEDs having different colour temperatures can be used, for example, for illuminating areas of the interior with different storage temperatures in order to guide the different suitability of these areas for different chilled goods intuitively before the eyes of a user.

Figure 2:
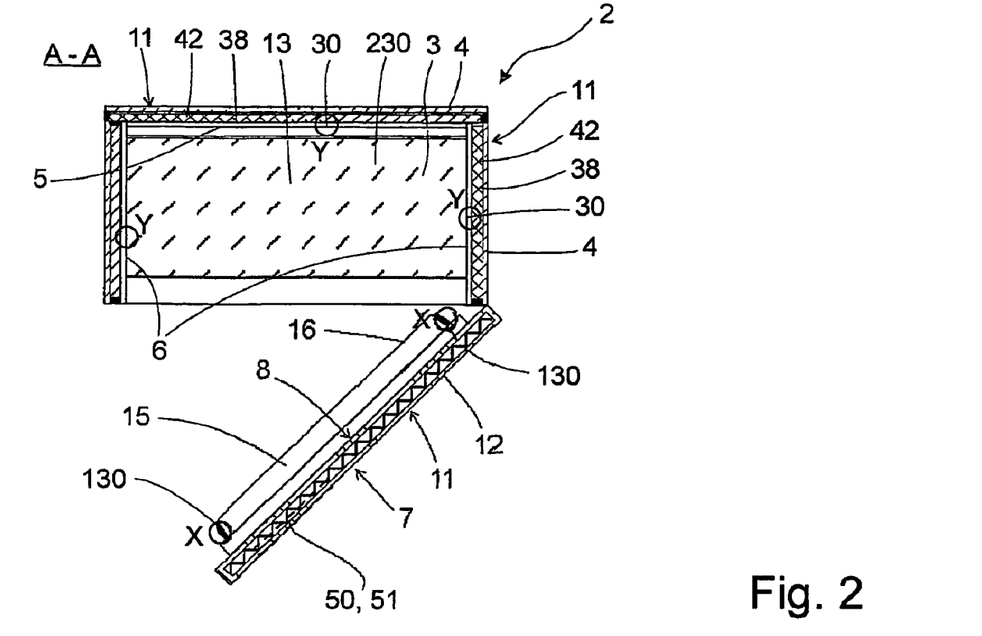
FIG. 2 is a cross-section through the refrigerating appliance 1 from FIG. 1 along the section A-A.

FIG. 2 shows a cross-section through the refrigerating appliance 1 according to FIG. 1 along the section A-A which can be seen from FIG. 1. The same reference numbers in the two figures designate the same parts. The housing panels 11 each comprise a cavity 42 filled with an insulating material 38. The cavity 42 is terminated by one of the inner walls 5, 6, 8 towards the interior 3 of the refrigerating appliance 1. The side of each housing panel 11 facing away from the interior 3 is respectively formed by an outer wall 4 of sheet metal. In this first embodiment of the refrigerating appliance the inner walls 5 and 6, i.e. the rear wall 5 and the two side walls 6 are formed by OLEDs 30. This is shown in detail in FIG. 3 for a section Y of a housing panel 11 from FIG. 2, comprising the right side wall 6.

Figure 3:
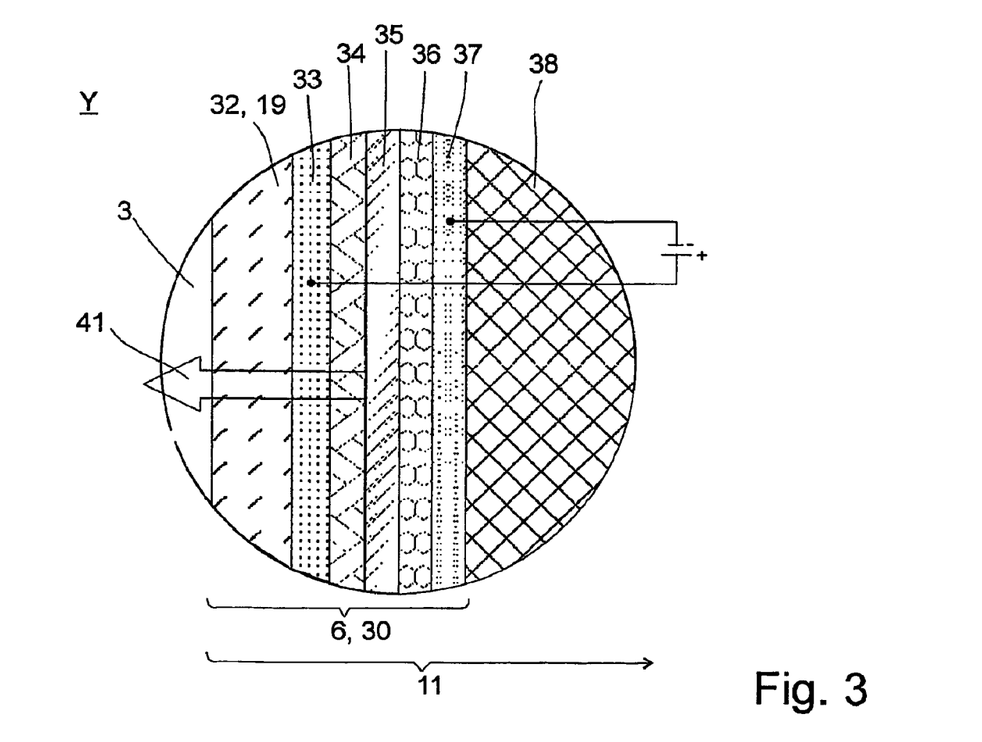
FIG. 3 is a partial cross-section of a housing panel 11 of the refrigerating appliance 1 from FIGS. 1 and 2 in a section Y.

Accordingly, according to FIG. 3, the side wall 6 comprises a plurality of layers arranged in a sandwich fashion. Towards the interior 3 of the refrigerating appliance 1, the side wall 6 initially comprises a transparent plate 19, in this case in the form of an impact-resistant plastic plate 32. This serves as a substrate 32 for the organic light-emitting diode 30. Located on this plate 32 is a layer 33 of indium tin oxide (ITO). This layer forms an anode 33 of the OLED 30. Next follow a plurality of layers 34, 35 and 36 comprising at least one electroluminescent layer 35 which is also designated as an organic emitter layer 35. In the present embodiment the layer 34 is a hole injection layer (HIL) and the layer 36 is an electron transport layer (ETL). The layers 34, 35 and 36 consist of polymers, oligomers or small functional molecules. These layers are followed by a layer 37 which forms the cathode 37. This is composed of two metal layers, which is not shown however, an underlayer formed from a metal having a low work function such as Ca, Mg, Ba or Li and a cover layer comprising a metal which is more stable with respect to air and having a high work function such as Ag or Al. The next is a layer of insulating material 38 and then the outer wall 4 which can be seen from FIG. 2. The thickness of each of the layers 33, 34, 35, 36 and 37 lies in the range between about 50 nanometers and 20 micron.

During operation of the OLED 30 from FIG. 3, a voltage is applied between the anode 33 and the cathode 37, charge carriers are injected into the organic layers 34, 35 and 36, recombination takes place and some of the recombination energy leaves the OLED 130 as photons. The photons pass through the transparent anode 33 and the transparent substrate 32 and are visible as emitted light 41. The OLED interior lighting is switched on by means of a switch, not shown, which is actuated by the door 7.

Figure 4:
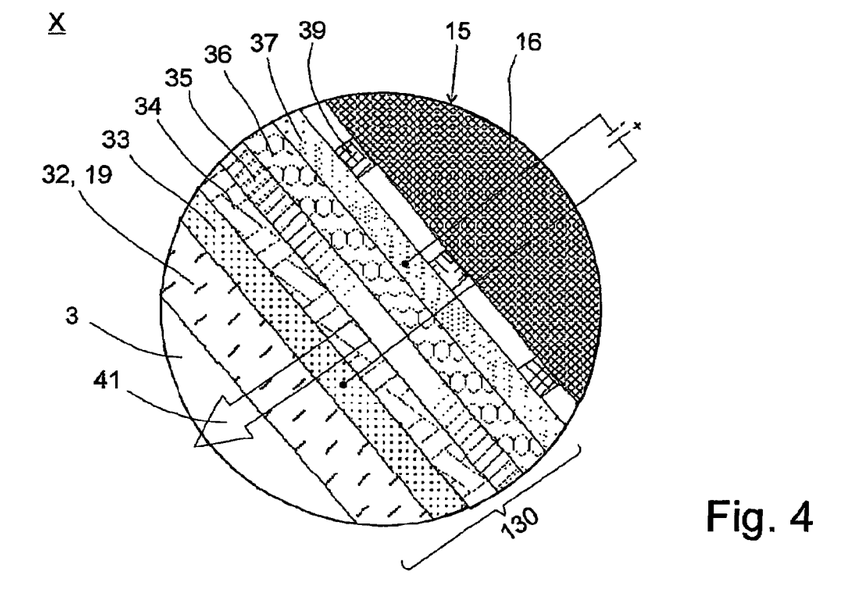
FIG. 4 is a partial cross-section of a door compartment 15 in a section X from FIG. 2.

Returning to FIG. 2, the refrigerating appliance 1, as has already been described with reference to FIG. 1, has respectively two organic light-emitting diodes 130 on the respectively two side walls 16 of the door compartment 15. A section X of a door compartment 15 with applied OLED 130 is shown in FIG. 4. The section X shows a cross-section through the OLED 30 with a part of the wall 16 of the door compartment 15. The layers 32 to 37 are the same as in the OLED 30 from FIG. 3. The cathode 37 is applied to the wall 16 of the door compartment 15 by means of an adhesive layer 39. In the configuration according to FIG. 4, the OLED 130 accordingly forms a component separate from the door compartment 15, which is glued on the wall 16. Other means for application, such as screwing or the like are also possible.

Figure 5:
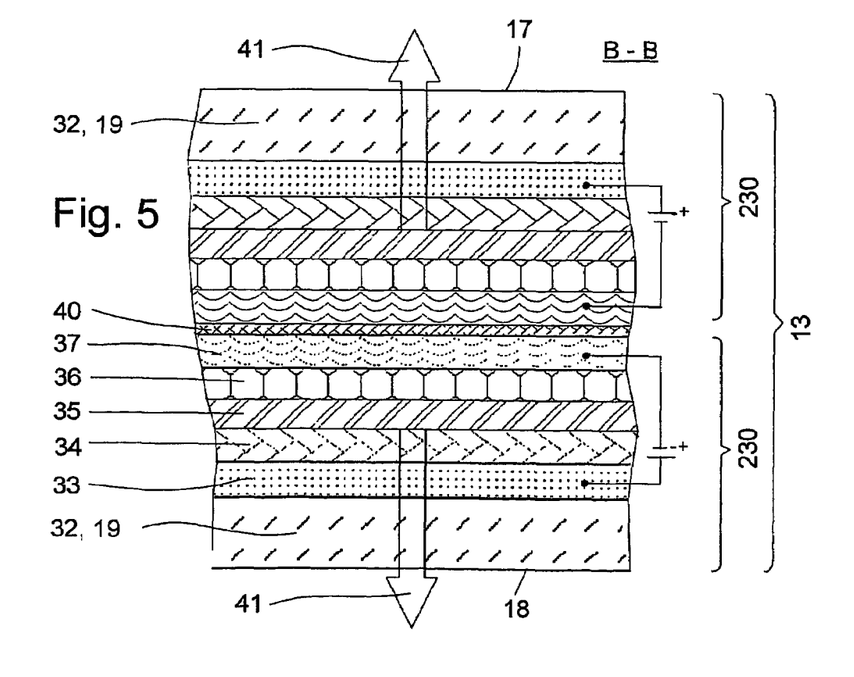
FIG. 5 is a partial cross-section through a base plate 13 along the line B-B from FIG. 1.

FIG. 5 shows the base plate 13 from FIG. 1 fitted with two OLEDs 230 in a sectional view along the line B-B. The base plate 13 comprises two OLEDs 230 which are integrated in the base plate 13. The base plate 13 has a transparent plate 19, in this case a glass plate 19, respectively on its lower side 18 and on its upper side 17. The two plates 19 each form a substrate 32 for one of the OLEDs 230. The structure of the OLEDs from layers 33 to 37 is the same as that described with reference to FIG. 3. The two OLEDs 230 are held together by an adhesive layer 40 between their cathodes 37. A structure in which a single cathode 37 belongs to both OLEDs 230 would fundamentally also be feasible. During operation of the two OLEDs 230 these emit light 41 from the opposite surfaces 17 and 18.

The power supply for the organic light-emitting diodes 30 on the door compartments 15 and the base plate 13 (see FIG.

1) is provided by means of contacts not shown at the suspension, slide-in or mounting points of the door compartment 15 or base plate 13.

Figure 6:
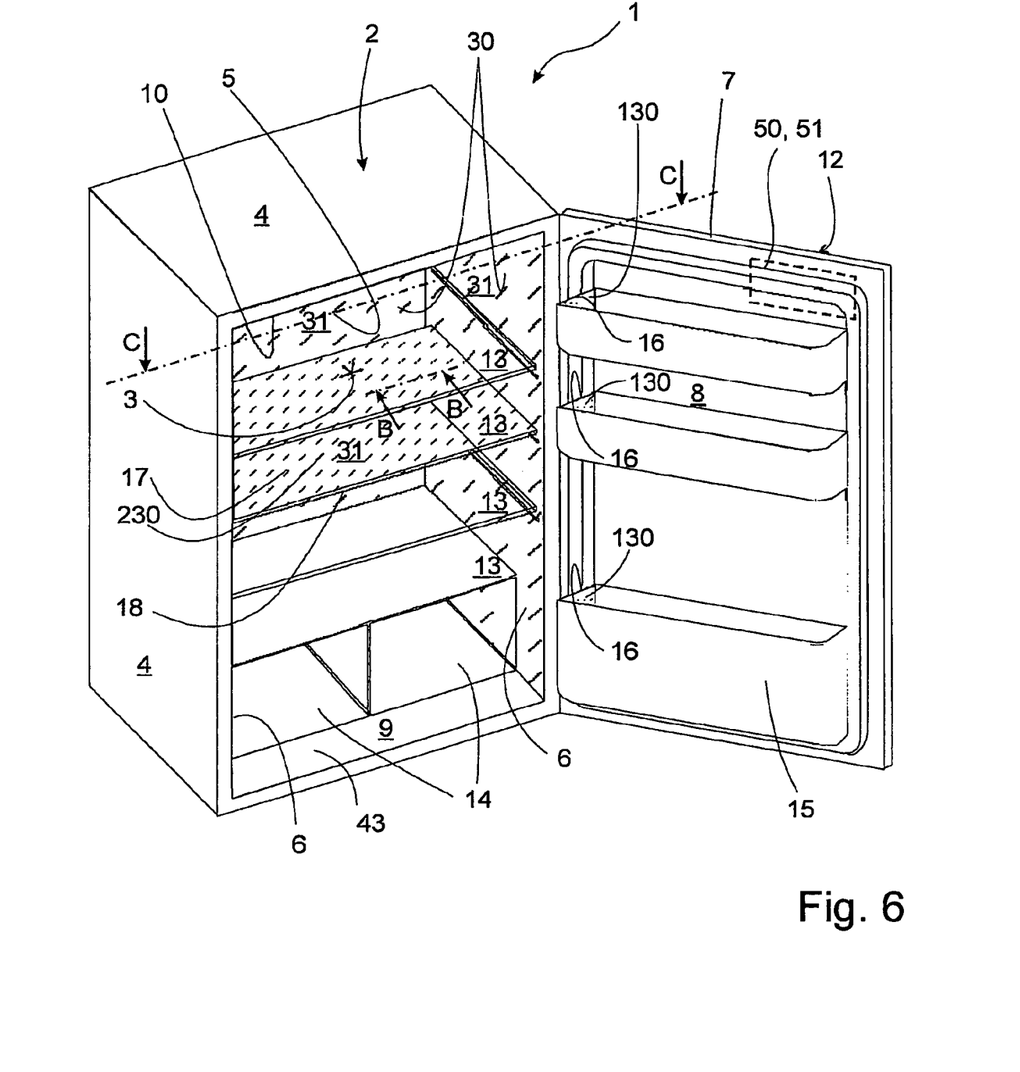
FIG. 6 is a perspective view of a second embodiment of a refrigerating appliance 1 according to the present invention.

FIG. 6 shows a second embodiment of a refrigerating appliance 1 according to the invention. In this refrigerating appliance 1, the inner walls 5, 6, 8, 9 and 10 are formed by a plastic body 43 moulded in one piece in contrast to the refrigerating appliance 1 according to FIG. 1. The rear wall 5 and the two side walls 6 are each fitted with an OLED 30, these being applied to the inner walls 5, 6, however, unlike those in FIG. 1. They represent components separate from the inner walls 5, 6 which are attached by gluing thereto for example.

Figure 7:
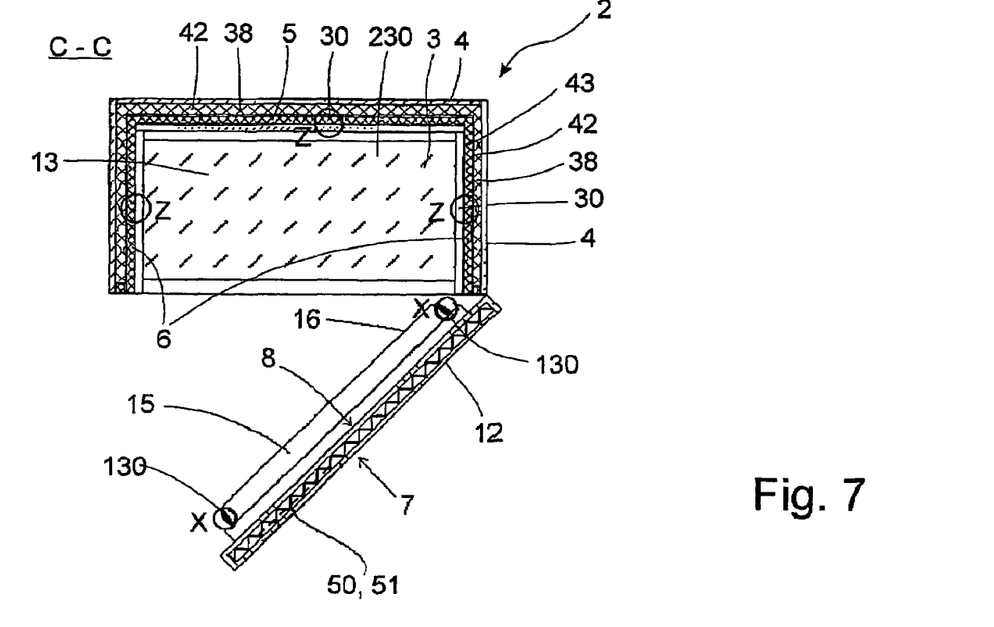
FIG. 7 is a cross-section through the refrigerating appliance 1 from FIG. 6 along the section C-C.

FIG. 7 shows in cross-section the detailed structure of the refrigerating appliance housing 2 along the section C-C from FIG. 6. The outer walls 4 are formed by individual sheet-metal panels which are joined together. The inner walls 5, 6 are formed in one piece by the plastic body 43. Located between the plastic body 43 and the outer walls 4 is a cavity 42 filled with insulating material 38. Respectively one OLED 30 is applied to the inner walls 5, 6. As shown in FIG. 1, the OLEDs 30 each extend over the entire area of the rear walls 5 and the two side walls 6.

Figure 8:
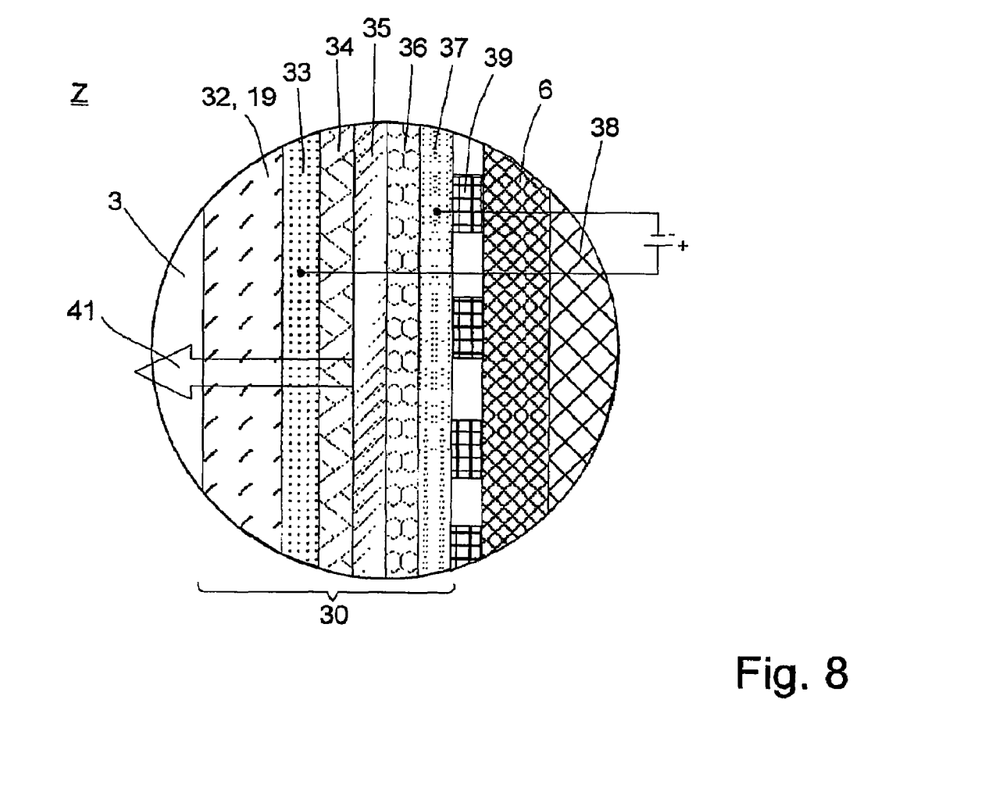
FIG. 8 is a partial cross-section of a lateral inner wall 6 of the refrigerating appliance 1 from FIGS. 6 and 7 in a section Z.

FIG. 8 shows a section Z of the OLED 30 applied to the right side wall 6. The OLED 30 first comprises a substrate 32, in this case, a glass plate 19. This is followed by the further OLED material layers 33 to 37 which have already been explained with reference to FIG. 3. The OLED 30 is glued to the side wall 6 using adhesive 39. Towards the outside this is then followed by the insulating material 38 and the outer wall 4 not shown.

Figure 9:
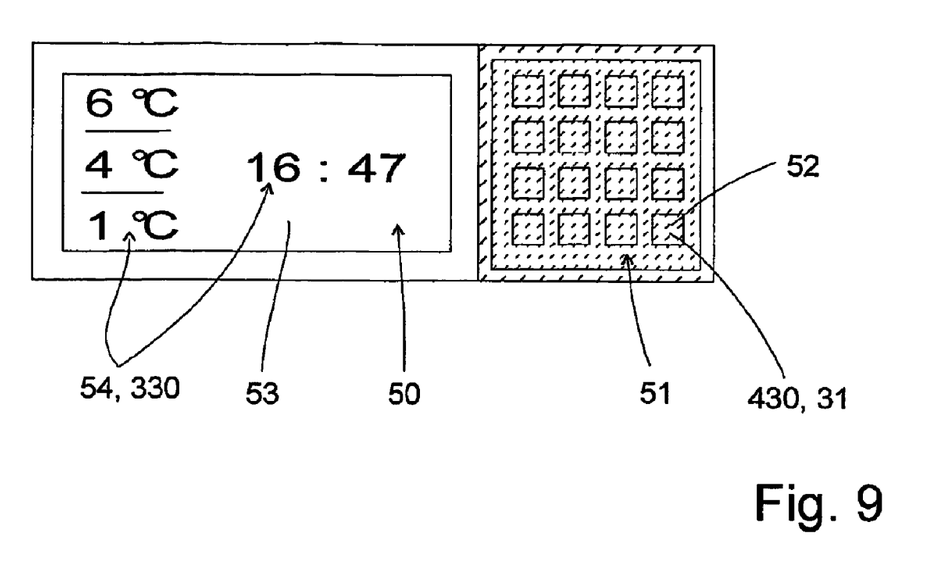
FIG. 9 is a display panel 50 and a control panel 51 of the refrigerating appliance 1 from FIG. 1 or 6.

FIG. 9 shows the display panel 50 and the control panel 51 mounted on the door outer wall 12 of the refrigerating appliance 1 from FIGS. 1, 2, 6 and 7. In the display panel 50 information for example on the internal temperature of the refrigerating appliance 1 is displayed in the form of symbols 54. The current time can also be displayed. The symbols 54 are formed by a plurality of organic light-emitting diodes 330. The control panel 51 has several push-buttons 52 which can be used to enter specific operating conditions of the refrigerating appliance, such as the temperature. Each of the push-buttons 52 is back-lit using an OLED 430 in each case. If the symbols 54 are not self-illuminating, the background 53 of the display panel 50 can be backlit using one or a plurality of OLEDs. The OLEDs 330 or 430 can additionally comprise light-emitting layers which emit light of different colour spectra. In general, it is also feasible for a display panel 50 and/or a control panel 51 of the type described to be disposed in the interior 3 of the refrigerating appliance 1. Thus, this could also be used as interior lighting.

The invention claimed is:

1. A refrigerating appliance comprising:
a housing defining an interior space including a plurality of internal walls;
an internal lighting system disposed within said housing for illuminating at least a portion of said interior space, said internal lighting system including at least one organic light-emitting diode (OLED) for illuminating at least a portion of said interior space, said OLED including a substrate having applied thereto an electrode, at least one layer of organic material and a counter-electrode, said substrate formed as a transparent plate, wherein said OLED is supported in said housing for forming a luminous surface from at least one of said internal walls and a built-in component located in said interior space, said OLED being integrated into at least one of said internal walls and a surface of said built-in component.

2. The refrigerating appliance according to claim 1, wherein said built-in component of the appliance comprises opposite surfaces, wherein respectively one organic light-emitting diode is applied to the opposite surfaces.

3. The refrigerating appliance according to claim 1, wherein said housing includes a cavity filled with an insulating material, said OLED forming at least a portion of a wall of said cavity facing said interior space.

4. The refrigerating appliance according to claim 1, wherein component includes at least one of a base plate, a shell or a door compartment.

5. The refrigerating appliance according to claim 4, wherein a luminous area of said OLED substantially completely fills at least one inner wall of said interior space, the underside or the upper side of a base plate located in said interior space.

6. The refrigerating appliance according to claim 5, wherein said luminous area is located on at least one of the following inner walls of said interior space, a rear wall, one of a plurality of side walls, a base area, a ceiling area or a door inner wall.

7. The refrigerating appliance according to claim 1, wherein said OLED includes a luminous area filling between 20% and 50% of an inner wall of at least one of said interior space, the underside or the upper side of a base plate located in said interior space.

8. The refrigerating appliance according to claim 1 wherein the housing is joined together from a plurality of housing panels forming inner walls of said interior space.

9. The refrigerating appliance according to claim 8, wherein at least one OLED is applied to at least one of said housing panels or integrated therein.

10. The refrigerating appliance according to claim 9, wherein said interior space includes a built-in component with opposed surfaces, said opposed surfaces are each formed from transparent plates, forming substrates for OLEDs disposed between said transparent plates.

11. The refrigerating appliance according to claim 10, wherein said built-in component with opposed surfaces is a base plate having an underside surface and an upper side opposed surface.

12. The refrigerating appliance according to claim 1, wherein said transparent plate is formed from glass.

13. The refrigerating appliance according to claim 1, wherein said interior lighting system includes a plurality of OLEDs, each with light-emitting layers, and at least some of said OLEDs emit light having different color spectra from one another.

14. The refrigerating appliance according to claim 1, further comprising at least one of a display panel and a control panel, said panel backlit using at least one organic light-emitting diode.

15. The refrigerating appliance according to claim 1, further comprising a display panel for displaying symbols, said symbols formed by organic light-emitting diodes.

\* \* \* \* \*

UNITED STATES PATENT AND TRADEMARK OFFICE
CERTIFICATE OF CORRECTION

PATENT NO.       : 7,588,340 B2                          Page 1 of 1
APPLICATION NO.  : 10/567323
DATED            : September 15, 2009
INVENTOR(S)      : Bauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 189 days.

Signed and Sealed this

Twenty-first Day of September, 2010

David J. Kappos
*Director of the United States Patent and Trademark Office*